(12) United States Patent
Bardou et al.

(10) Patent No.: US 8,784,920 B2
(45) Date of Patent: Jul. 22, 2014

(54) SYSTEM AND METHOD FOR PACKAGING

(75) Inventors: Jean-Francois M. Bardou, Sainte Bazeille (FR); Roland Guezennec, Marmande (FR); Jean-Pierre Lhommond, Marmande (FR)

(73) Assignee: St. Dalfour SAS, Paris (FR)

( * ) Notice: Subject to any disclaimer, the term of this patent is extended or adjusted under 35 U.S.C. 154(b) by 2270 days.

(21) Appl. No.: 11/717,459

(22) Filed: Mar. 13, 2007

(65) Prior Publication Data
US 2008/0156804 A1  Jul. 3, 2008

Related U.S. Application Data

(60) Provisional application No. 60/878,010, filed on Dec. 29, 2006.

(51) Int. Cl.
A23L 3/10  (2006.01)

(52) U.S. Cl.
USPC ........... 426/403; 426/395; 426/407; 426/412; 53/127; 53/266.1; 53/440; 53/471; 53/478; 53/281; 220/203.15; 220/203.16; 220/203.18; 220/254.1; 220/359.4

(58) Field of Classification Search
USPC ......... 426/113, 118, 234, 395, 403, 407, 412; 53/127, 266.1, 440, 471, 478, 281; 220/203.15, 203.16, 203.18, 254.1, 220/359.4
See application file for complete search history.

(56) References Cited

U.S. PATENT DOCUMENTS

| | | | | |
|---|---|---|---|---|
| 1,689,641 A | | 10/1928 | Pickles | |
| 2,321,408 A | | 6/1943 | Mills et al. | 220/67 |
| 2,338,003 A | | 12/1943 | Mills et al. | 99/182 |
| 3,053,409 A | * | 9/1962 | Brookson | 220/614 |
| 3,204,595 A | | 9/1965 | Brookson | 113/121 |
| 3,592,353 A | * | 7/1971 | Bowen | 220/359.4 |
| 3,935,960 A | * | 2/1976 | Cornell | 220/260 |
| 4,156,741 A | * | 5/1979 | Beauvais et al. | 426/131 |
| 4,363,582 A | * | 12/1982 | Bloeck et al. | 413/12 |

(Continued)

FOREIGN PATENT DOCUMENTS

| | | | | |
|---|---|---|---|---|
| FR | 2578817 | | 9/1986 | B65D 85/72 |
| GB | 1 400 038 | * | 7/1975 | |

(Continued)

OTHER PUBLICATIONS

Can Standards, Can Manufactures Institute, 2006 no month, retrieved from the internet Aug. 27, 2010. Retrieved from <URL:http://www.cancentral.com/standard.cfm>.*

*Primary Examiner* — Rena L Dye
*Assistant Examiner* — Chaim Smith
(74) *Attorney, Agent, or Firm* — Drinker Biddle & Reath LLP

(57) ABSTRACT

In one embodiment of an apparatus and process for packaging foodstuffs or other materials in a rigid container sealed by a flexible cover, a desired quantity of material to be packaged containing or together with some water or other liquid is placed in the container, the flexible cover is secured on the container so as to leave at least one unsealed opening, the container is heated and/or placed in a partial vacuum to bring the liquid above its boiling point to cause or permit vapor generated by the boiling liquid to expel other gases from the container through the unsealed opening, and the container is sealed while gas or vapor is still flowing out of the container through the unsealed opening.

12 Claims, 3 Drawing Sheets

(56) References Cited

U.S. PATENT DOCUMENTS

| | | | |
|---|---|---|---|
| 4,689,936 A * | 9/1987 | Gaikema et al. | 53/440 |
| 5,069,355 A * | 12/1991 | Matuszak | 220/270 |
| 5,457,939 A * | 10/1995 | Bardou et al. | 53/432 |
| 5,752,614 A * | 5/1998 | Nelson et al. | 220/276 |
| 5,954,214 A | 9/1999 | Guezennec et al. | |
| 6,193,094 B1 * | 2/2001 | Diamond et al. | 220/254.1 |
| 6,427,862 B1 * | 8/2002 | Hsu | 220/276 |

FOREIGN PATENT DOCUMENTS

| | | | |
|---|---|---|---|
| GB | 2 232 056 | * 12/1990 | A23L 3/01 |
| GB | 2251541 | 7/1992 | A23L 3/02 |
| JP | S59221221 A | 12/1984 | |
| WO | 95/06589 | 3/1995 | B65B 31/02 |

* cited by examiner

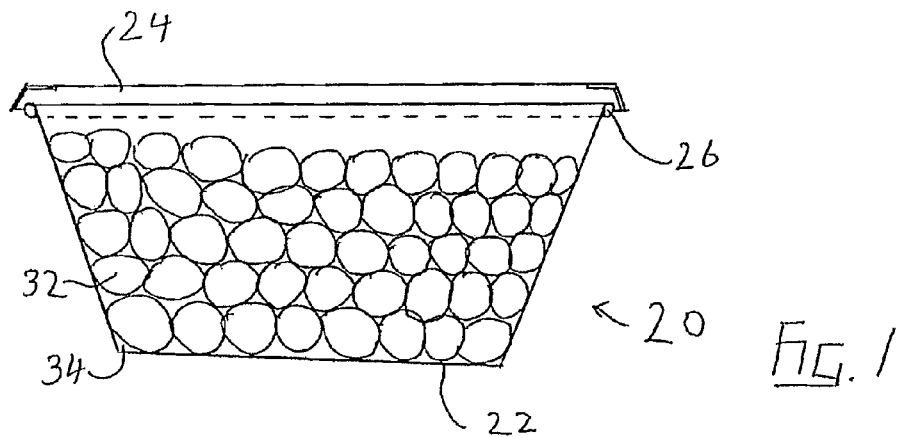
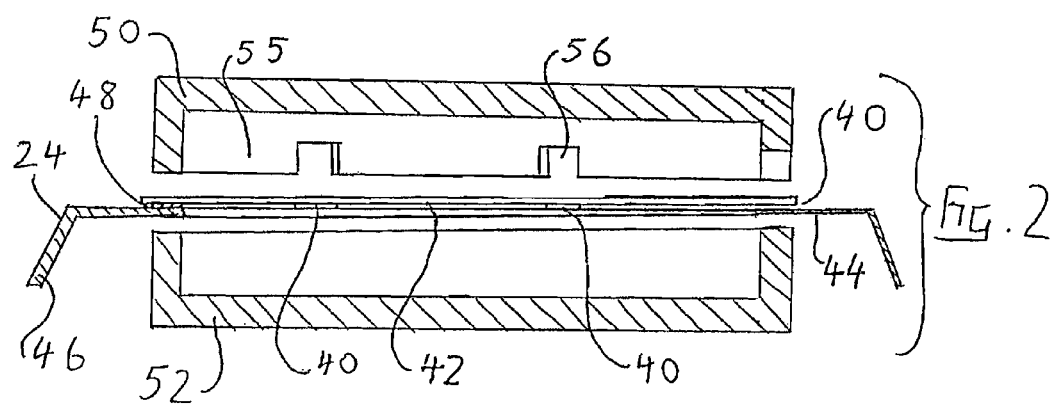
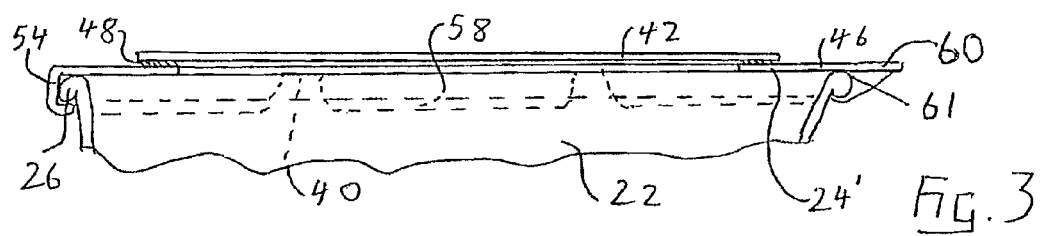

SYSTEM AND METHOD FOR PACKAGING

CROSS-REFERENCE TO RELATED APPLICATIONS

The present application claims benefit of U.S. Provisional Patent Application No. 60/878,010, filed Dec. 29, 2006, which is incorporated herein by reference in its entirety.

FIELD OF THE INVENTION

The present invention pertains to an improved process for packaging of foodstuffs, comestibles, and other substances in rigid or partly-rigid containers for preservation and storage.

BACKGROUND

Canning or otherwise packaging foods to preserve and store them for long periods of time has been an important part of food processing since the eighteenth century, when a Parisian chef named Appert devised a crude method of canning. Appert's process was introduced into the United States through England in about 1818. Canning remained an inexact process until Louis Pasteur applied his principles of fermentation to it in 1895.

Today, from picking to packaging, canning and bottling is a highly-developed, scientific industry. Foodstuffs are packaged in many different types of containers, with metal cans, glass jars and plastic packages being used on a wide scale. For convenience, the packaging of foodstuffs in rigid containers (i.e., cans, jars and rigid plastic packages) will be referred to collectively herein as "canning." No matter what type of container is used, however, all canning processes must deal with the sensitivity of most foods to oxygen. As anyone who has sliced a fresh apple knows, oxygen in the air immediately begins to react with fresh foods and leads to the loss of their organoleptic qualities and to their rapid spoilage. All foods are sensitive to oxygen in varying degrees, and the successful preservation of foods by canning requires, as an important step, the elimination of oxygen from the containers.

Conventional canning processes rely on the use of liquids to displace oxygen and other gases from the containers. Typically, the foodstuffs being canned are placed in the containers and then covered with a liquid, which may be water, brine, or syrup. The covering liquid is preheated to a temperature of about 100° C. before it is added to the containers, or the containers are heated with liquid inside them. The liquid thus displaces the air and other gases in the containers. The containers are then sealed while at that temperature. Usually, the containers are also further heated to temperatures between 115° C. and 140° C. in order to sterilize the contents.

The lid or cap of the container may be placed loosely on the container before heating, so that it does not form a seal. The air within the container is then expelled through the remaining gap between the container and the lid. Alternatively, the heating may be carried out in a closed chamber from which air has been removed, in a steam atmosphere.

Flexible or partly flexible containers, for example, an open-topped rigid plastic container that has a flexible plastic film lid sealed across the open top, are used for various purposes. However, practical problems arise in using canning methods with such containers. In particular, the film lid is not sufficiently stable to be placed on the open top of the container without being sealed in place. If the lid is sealed at atmospheric pressure before sterilization, the high pressure inside the sealed container during sterilization can damage the seal. Because the seal is typically a thermoplastic weld, the seal may be weak at high temperatures. Some seals in general use can be damaged by an internal pressure of 0.1 atmosphere (about 10 kPa gauge pressure) at a temperature of 90° C. Conducting the entire canning process, including the sterilization, in a controlled steam environment to keep the internal and external pressures matched is inconvenient and expensive.

The process of the present invention embodies the advantages of canning without the concomitant disadvantages of prior processes, and results in a canned foodstuff which retains all its desirable organoleptic properties.

SUMMARY

According to one aspect of the invention, there is provided an apparatus and process for packaging foodstuffs or other materials in a rigid container sealed by a flexible cover, in which a desired quantity of material to be packaged containing or together with some water or other liquid is placed in said container, the flexible cover is secured on the container so as to leave at least one unsealed opening, the container is heated to bring the temperature of the liquid to a temperature higher than its boiling point, causing or permitting vapor generated by the boiling liquid to expel other gases from the container through the at least one unsealed opening, and the container is sealed while gas or vapor is still flowing out of the container through the at least one unsealed opening.

The material being packaged may be a moist foodstuff, with the liquid that is boiled being some of the water in the foodstuff.

A temperature above boiling point may be determined empirically. Typically, at standard atmospheric pressure, free water in or on top of the foodstuff will boil at 100° C. (212° F.) or slightly higher, depending on dissolved solids that may elevate the boiling point. In the case of a foodstuff that is moist, but does not have visible free water, the effective boiling point may be slightly higher, or the rate of generation of steam may be low, or both. The expulsion of air by steam may then be carried out at a temperature of about 102° C. to 110° C. If the pressure outside the container is higher or lower than standard atmospheric pressure, the temperature may be adjusted accordingly.

Even for sterilization at 140° C., a pressure cooker or other closed chamber at superatmospheric pressure is not necessary, because the unsealed openings allow steam to escape and avert a build-up of pressure that might damage the seal. However, because the rate of production of steam is temperature-dependent, the maximum intended temperature during any sterilization step may be taken into account in deciding the size and number of the unsealed openings. In addition, if the pressure may rise high enough to overstress the partial seal, the entire seal may be re-formed during the subsequent sealing step.

The container may be removed from an oven or other source of heat before it is sealed, because the thermal mass of the contents will result in boiling, and consequent emission of steam, continuing for a short period even if the container is removed to a cool environment. The rate of generation of steam usually diminishes rapidly once the source of heat is removed, and depending on the shape, size, and number of the unsealed openings and the desired standard of sterility, it may be preferred to maintain a certain minimum flow rate of steam out of the openings until sealing is complete.

The humid foodstuff may be food that naturally has a high water content, such as soup, and "foodstuff" includes beverages and other comestibles. Alternatively, water may be added specifically in order to generate steam. However, even foodstuffs with no visible free water, such as vegetables, including humidified legumes, cooked pasta, and meat, can generate enough steam for the present process without added water.

According to another aspect of the present invention, there is provided a method of forming a sealed container under partial vacuum. A material comprising a volatile liquid is placed in a container body. A flexible cover is secured on the container body so as to leave at least one unsealed opening. The container is heated to bring the volatile liquid to a temperature higher than its boiling temperature. Vapor generated by the boiling liquid expels other gases from the container through the at least one unsealed opening. The container is sealed while vapor is still flowing out of the container through the at least one unsealed opening. The container is cooled to a temperature at which the vapor pressure of the volatile liquid is substantially less than the ambient pressure outside the container.

According to another aspect of the invention, at least part of the process is carried out under partial vacuum, in order to reduce the temperature at which the liquid boils. The partial vacuum may be maintained at least from the point in the process at which the liquid first boils to the point at which the container is finally sealed. Before boiling, the container may be heated in the partial vacuum, or may be heated under atmospheric pressure and then transferred to the partial vacuum. The point at which boiling first occurs may then be determined either by the temperature rising, or by the pressure falling, or both. By application of a sufficiently deep partial vacuum, the desired boiling may be achieved at ambient temperature, although that will seldom be the optimum process.

The use of a partial vacuum may be beneficial in the case of products that might be adversely affected by heat, for example, foodstuffs with water that would cook undesirably at 100° C. In that case, the temperature may be as low as is considered expedient to protect the product, with a correspondingly deep vacuum. In addition, or alternatively, at moderate vacuum levels the saving on energy by reducing the temperature of the process may outweigh the capital and energy cost of building and operating the vacuum chamber.

According to another aspect of the invention, there is provided a sealed container comprising a rigid body, a flexible lid sealed to the rigid body, and liquid-containing contents within the container. The lid has been sealed to the body in at least two stages, with the first stage forming a major portion of the seal and the last stage sealing the portions of the seal previously left unsealed, the contents have been treated at a temperature above a boiling point of the liquid, and the container has a head-space from which uncondensable gases are substantially absent.

Unless the sealed container or its contents have been detectably affected by heat, it may not be apparent whether the container was prepared under partial vacuum or at ambient pressure. In particular the internal pressure of the container will be determined almost entirely by the vapor pressure of the volatile liquid at ambient temperature, which is not dependent on the history of the container.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a schematic drawing of a container with a lid.

FIG. 2 is a diagram showing one form of lid and a lid-forming device.

FIG. 3 is a diagram showing another form of lid.

DETAILED DESCRIPTION

Figure 4:
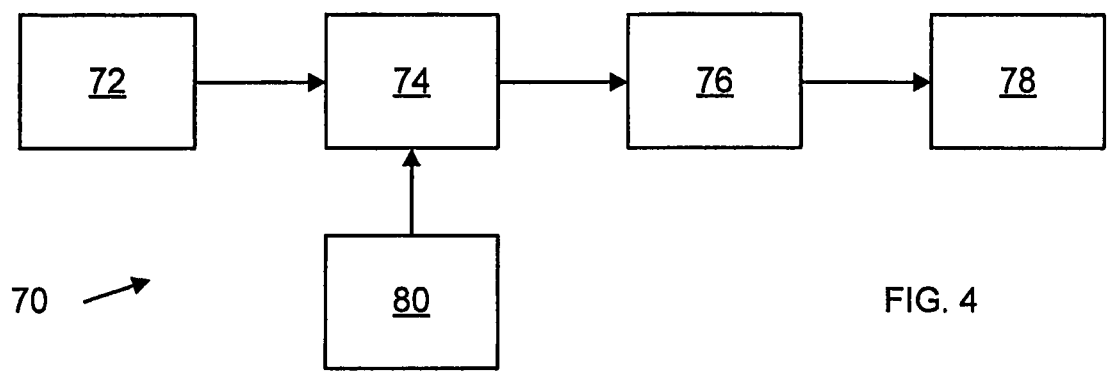
FIG. 4 is a schematic drawing of one embodiment of a bottling or canning system.

Reference will now be made in detail to various embodiments of the present invention, examples of which are illustrated in the accompanying drawings.

Referring initially to FIG. 1, one embodiment of a container for foodstuffs or the like is indicated generally by the reference number 20. The container 20 consists of a rigid plastic tub 22 of thermoplastic material that is sealed, or is to be sealed, by a flexible lid 24. The lid 24 is clinched over a rim 26 of the tub 22, as is described in more detail below.

Suitable materials for the tub 22 are well known to those skilled in the packaging arts, and in the interests of conciseness are not further discussed here.

Inside the tub 22 is a material 32 to be packaged. The material 32 may be a foodstuff that is to be packaged substantially free from atmospheric oxygen, and at least partly pasteurized or sterilized by heating. However, the present processes and systems may be applied to any material that it is desired to package in sealed containers, that will evolve steam or other vapor on heating, and that will not be harmed by the heating. The material 32 may be a material that has a high water content, or additional water 34 may be added to the container.

Because at standard atmospheric pressure a volume of water produces approximately 1,000 times the volume of steam when boiled, only a small quantity of water is required to effectively expel all the air from the space 36 at the top of the tub 22 under the lid 24. An amount of water about 5% of the volume of the container, generating an amount of steam about 50 times the volume of the container, has been found to be satisfactory. Where the contents 32 are fluid, so that the container 20 is filled except for a small head-space, the amount of liquid may be based on the head-space, rather than the total volume of the container 20.

Referring now to FIG. 2, in one embodiment of the lid 24, a disk of flexible film 42 is attached to an inwardly-extending flange 44 of a rim 46 by a heat seal 48. The heat seal 48 is formed by clamping the film 42 and rim 46 between a pair of circular dies 50, 52, at least one of which is heated and at least one of which is crenellated. The merlons 55 of the crenellated die 50 apply pressure to form and set the heat seal, while the crenels 56 allow the unsealed gaps 40 to remain between the sealed sections.

In a practical embodiment, the film 42 may be supplied in sheets or strips, and the upper die 50 may be provided with a cutter that cuts a disk 42 of the correct size substantially simultaneously with heat sealing the disk 42 to the rim 46. The cutter may be substantially conventional and, in the interests of simplicity, is not shown in FIG. 2.

The film disks 42 may be a laminate material in which the bottom layer is formulated primarily for adhesion to the rim 46, and other layers are formulated for other properties, such as imperviousness to air, mechanical strength to support atmospheric pressure without cracking when the sealed package is cooled, appearance, and printability. Laminates with several layers of different plastics, optionally including an aluminum layer, are suitable. The rim 46 may be formed of aluminum, steel, or other metal, or of a plastic material that has suitable mechanical properties.

The heat seal 48 may be formed by welding the film disk 42 to the rim 46 if the materials of the disk 42, or the bottom layer of the disk 42, and the rim 46 are suitable. Alternatively, an adhesive may be used. Hot melt adhesives that can be activated by a heated sealing tool are suitable in many cases.

Suitable materials for the disk 42 and the rim 46, and techniques for welding them together, are well known to those skilled in the packaging arts, and in the interests of conciseness are not further discussed here.

When the lid 24 is initially applied to the tub 22, the heat seal 48 does not extend around the entire periphery of the rim 46. Instead, one or more gaps 40 are left. It is preferred to provide several gaps, evenly spaced around the rim. With only a single gap, or unevenly spaced gaps, the jet of air and steam could in some embodiments generate sufficient thrust to physically displace the container, and could jam a canning system. The steam flow could also displace the contents of the container, and might in some cases result in clogging of a single gap, or in contamination of the seal 48 within the gap 40 so that a satisfactory final seal is not achieved. In addition, uneven venting could result in uneven pressure within the container, and uneven loss of moisture from the contents.

The lids 24 with the incompletely sealed film disks 42 may be formed before the lids 24 are placed on the tubs 22. That considerably simplifies the manufacturing process, because it allows access to the underside of the lid 24, so that the incomplete seal can be formed between the pair of dies 50, 52 instead of with only a single die. Substantially perfect sizing and positioning of the gaps 40 are comparatively easy to achieve, because the incomplete seal can be formed under controlled conditions away from the food packaging line. Compared with a process in which the heat seal is formed on the tubs 22, the lids 24 shown in FIG. 2 largely eliminate the risk of the seal being contaminated by the foodstuff or of the foodstuff being contaminated by seal materials. The rim 46 has a skirt 54 that fits over the circumferential bead 26 (best seen in FIG. 3) of the tub 22, and can be sealed in place in a conventional manner by clinching the skirt 54 under the bead 26 with rollers. When it is desired to complete the seal, a pressure on the outside of the lid 24 with an uncrenellated heated die similar to the die 52 suffices.

Referring to FIG. 3, an alternative form of lid 24' is similar to the lid 24 except that the heat seal 48 is formed with a pair of dies similar to the die 52, and does not have gaps. Instead, when the lid 24' is placed on the container 22, the rollers that clinch the skirt 54 are applied only intermittently, so as to clinch parts of the skirt 54 under the bead 26 at 58, and leave other parts unclinched at 60 to form gaps 61. The risk of the heat seal 48 being contaminated with foodstuff is completely eliminated, because the entire heat seal is formed before the lid 24' is placed on the tub 22. The clinching of the skirt 54, which is typically of thin metal sheet, onto the rigid bead 26 of the tub 22 gives a more reliable seal than finally heat-sealing the disk 42 to the rim 46 on the container 20. However, the alignment of the gaps 61 formed by the unclinched parts 60 is less easy to control precisely when the gaps are formed on the container.

When it is desired to complete the seal, the container 20 is passed through another set of clinching rollers, which may be aligned with the unclinched parts 60 or may be set to operate round the entire periphery of the container 20. In the latter case, the rollers pass harmlessly over the parts 58 that are already clinched, and clinch the remaining parts 60, without the need to ensure a specific alignment of the unclinched parts.

Referring now to FIG. 4 one form of bottling plant, indicated generally by the reference number 70, comprises a filling station 72 for tubs or other receptacles 22, a lidding station 74 at which film lids 24 are applied and incompletely sealed to the tubs 22, a heating station 76 at which the containers 20 with incompletely sealed lids 24 are raised to a temperature above the boiling point of water, and a sealing station 78 in which the containers 20 are fully sealed. A lid-making station 80, at which the lids 24, 24' are formed from film disks 42 and rims 46, may also be provided.

Figure 5:
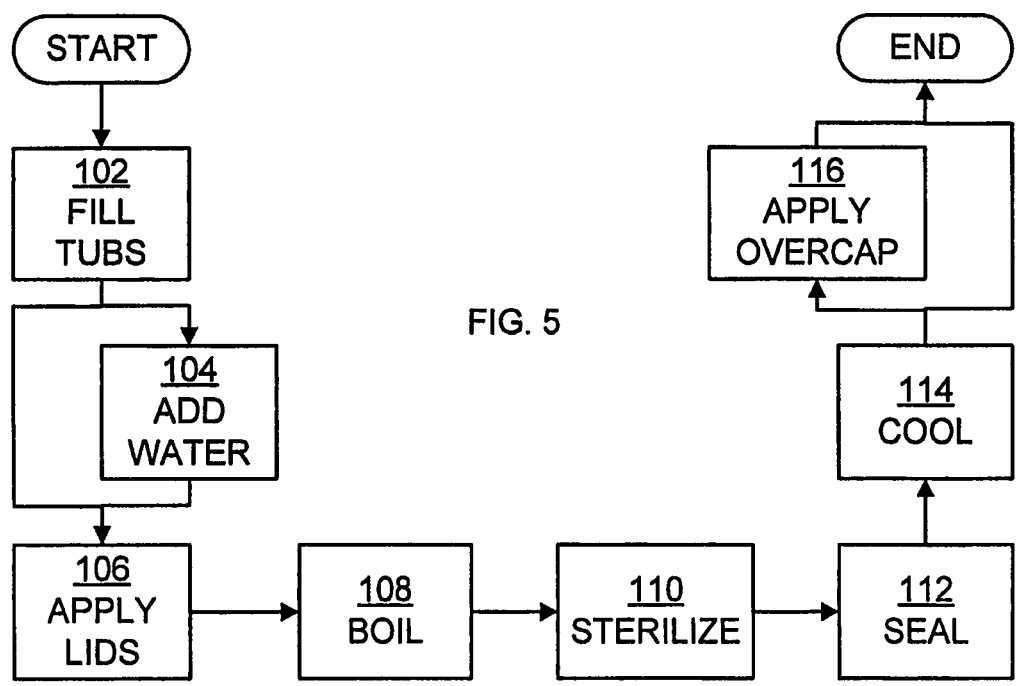
FIG. 5 is a flowchart.

Referring now also to FIG. 5, in use of the plant 70, in step 102 tubs 22 are filled with contents 32 in filling station 72. Optionally, in step 104 the tubs 22 are also filled with additional water 34. Alternatively, the contents delivered in step 102 may be prepared with a slightly higher water content than is intended for the final product, to allow for the amount that is later lost as steam.

In step 106, lids 24 are applied to the tubs 22. As described above, the lids 24 may be preformed in the lid-making station 20 with gaps 40 between the film disks 42 and the rims 46, and the skirts of the rims may be sealingly clinched to the beads of the tubs 22 in the lidding station 74. Alternatively, lids 24' may be applied, and incompletely clinched to the beads.

In step 108, in the heating station 76 the filled containers 20 are raised to a temperature just above the boiling point of their contents 32, 34. As the liquid 34 and/or the liquid component of the contents 32 boils, steam is produced, which displaces the air previously present in the top of the containers 20. First air, and then steam, flows outwards through the openings 40. Because of the steady outflow, and because of the small size of the openings 40, the re-entry of air, and the entry of other contaminants, is effectively prevented. The time spent in step 108 is largely determined by the rate at which steam is generated.

In step 110, the containers are raised to a desired temperature, and maintained at that temperature for a desired period of time, to produce a desired level of pasteurization of the contents 32. Maintaining the contents at a temperature of 102° C. to 110° C. for long enough to expel substantially all the air in the containers 20 may be sufficient for some uses. For other uses, a higher temperature, for example, from 115° C. to 140° C., and/or a longer time may be desirable. Such treatment may cause cooking or partial cooking of the contents 32, which may be acceptable, or even desirable, for some foodstuffs.

In step 112, the containers are sealed in the sealing station 78. The sealing station 78 may be integrated with the heating station 76. However, the sealing station 78 may be separate from the heating station 76. When the containers 20 are removed from the source of heat in the heating station 76, it takes a short time, depending on the size of the containers, the nature of their contents, and the temperature to which they were heated, before the contents 32 cool to the point at which they cease to evolve substantial steam. As long as the steam flow out through the openings 40 prevents the entry of contaminants through the openings, the contents of the containers 20 remain sterile. Provided the containers 20 are fully sealed before the steam flow drops, they do not need to be kept at a sterilizing temperature, or in a sterile environment, when transferred from the heating station 76 to the sealing station 78.

In step 114, the sealed containers 20 are cooled. The containers 20 may be actively cooled by refrigeration, or may be cooled by permitting them to cool naturally to room temperature. The choice may be influenced by how quickly it is desired to cool the contents, and to what final temperature.

In step 116, an outer lid or cap may then be applied over the flexible lid 24 to protect the flexible lid 24 from mechanical damage. Step 116 may occur before, during, or after step 114.

The sealing step 112 can be carried out to such a standard that the marks left by forming the gaps 40 and subsequently sealing the gaps 40 are imperceptible to the ordinary purchaser or user of the container 20 and its contents. However, there will typically be signs recognizable on expert examination. Alternatively, the sealed gaps 40 may remain visible and become part of the decorative appearance of the container 20. Where the vapor required in step 108 is evolved from a solid but moist contents, marks imperceptible to the ordinary user but recognizable to expert examination are typically left on the surface of the contents. The marks may be visible only under magnification. Where the vapor is evolved from free liquid, the boiling may be inferred from the presence in the sealed container of vapor at sub-atmospheric pressure and very little remaining air or other incondensable gas. For food packaging, the amount of air remaining is generally no more than about 5 cc in a 12 oz container (containing nominally 12 oz by weight, or 340 g, of contents), or about 1.5% of the volume of the container. The content of incondensable gas can usually be verified by opening the container under water, and collecting and measuring the bubbles that emerge. The vapor content can be verified by placing the container in a vacuum to equalize the internal and external pressures before opening the container to extract the vapor for sampling, if it is not sufficient to infer the nature of the liquid from the equalization pressure of its vapor at a given temperature. However, in many cases the composition of the vapor can be inferred with sufficient confidence by identifying in the opened container the liquid that provided the vapor.

The gap 40 is, or gaps 40 are, typically dimensioned so that the total area of the resulting openings is in the range from approximately 0.1% to 1% of the area of the tub 22. The area may be measured as the inside area of the rim 26, or as the liquid surface area of the material 32 or added liquid 34. The exact amount of the openings is dependent on the nature of the material 32 or 34 from which the steam or other vapor is to be produced, and the maximum temperature to which the container 20 is to be raised in step 110. The area of the gaps 40 should be sufficiently large that the maximum rate of generation of steam can be vented without an internal pressure high enough to damage the seals 48, but low enough that a steady outflow is maintained over the entire effective area of the gaps 40 until the gaps are finally sealed, to prevent air or contaminants from entering or re-entering the container 20. In the case of the lids 24, where the gaps 40 are partly bounded by the plastic film disks 42, the size of the crenels 56 of the die 50 directly determines the length of the gaps 40. The elasticity and flexibility of the film material of the disks 42 may also affect the effective area of the gaps 40.

Figure 6:
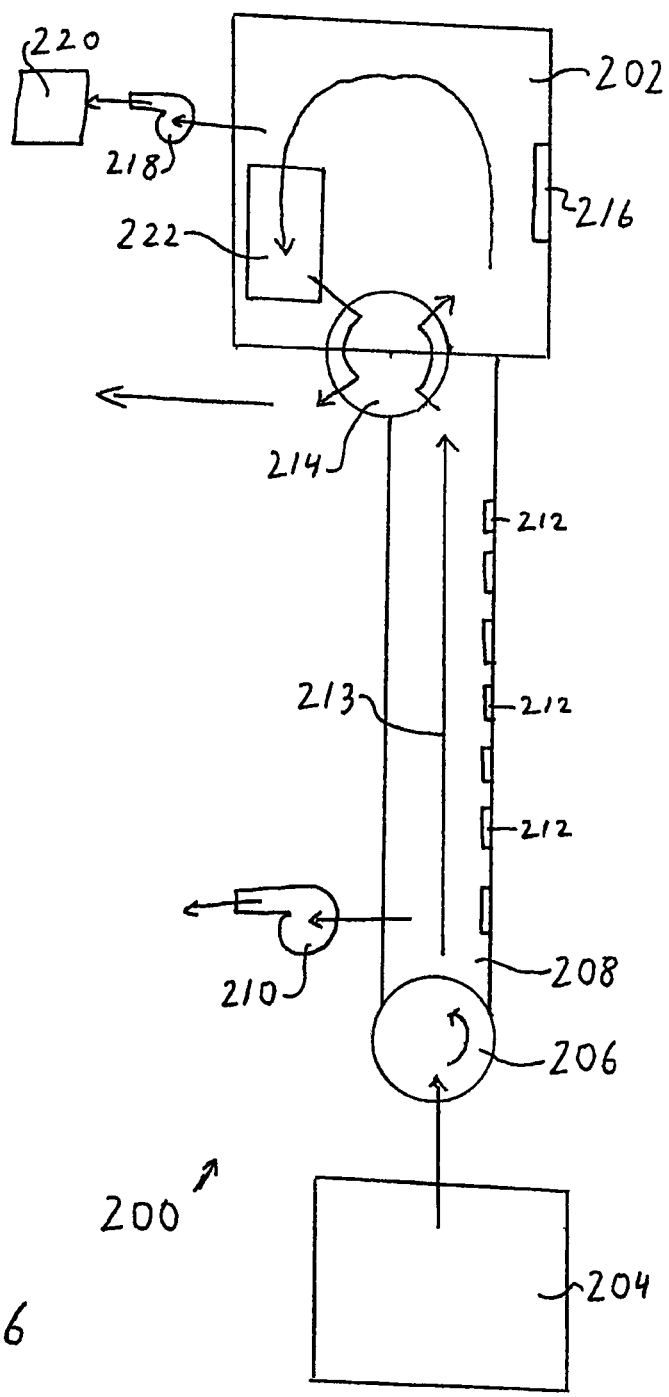
FIG. 6 is a schematic drawing of another embodiment of a bottling or canning system.

Referring now to FIG. 6, an alternative form of bottling plant, indicated generally by the reference number 200, incorporates a vacuum chamber 202 in which the containers can be heated and sealed under partial vacuum. Except as noted below, the vacuum chamber 202 and its ancillary equipment may be generally similar to those described in our earlier U.S. Pat. No. 5,457,939 and International Patent Application No. WO 95/06589, which are incorporated herein by reference in their entirety. In the interests of conciseness, the description of those features is not repeated here.

The bottling plant 200 comprises a comprises a filling and lidding station 204 for tubs or other receptacles 22 at which the tubs 22 are filled with contents 32, 34 and at which film lids 24, 24' are applied and incompletely sealed to the tubs 22. The apparatus and method for applying the lids may be as described above with reference to FIG. 2. The filling and lidding can be carried out at room temperature and pressure. Alternatively, depending on the contents of the tubs 22, the filling can even be carried out under refrigeration.

From the filling and lidding station 204 the containers 20, formed by the filled tubs 22 with incompletely sealed lids 24, pass through an air lock or valve 206 into a heating tunnel 208. The air lock 206 may be of any suitable type, depending in part on the shape of the containers 20. For example, the air lock 206 may be similar to the rotary air lock 14 shown in FIG. 2 of the drawings of our above-mentioned U.S. Pat. No. 5,457,939. The heating tunnel 208 is provided with a vacuum pump 210 that enables a partial vacuum to be maintained in the tunnel. The heating tunnel 208 is provided with heating units 212 that enable a desired temperature, or a desired temperature gradient, to be maintained in the tunnel 208. The principal purpose of the air lock 206 is to limit the load on the pump 210 and the heating units 212 caused by cold air flowing into the tunnel. The level of sophistication of the air lock 206 may be balanced against the power of the pumps and heating units.

The containers 20 are transported along the tunnel by a conveyor 213 that may be of conventional design and, in the interests of conciseness, is not described in detail. As the containers 20 pass along the heating tunnel 208, they are gradually heated by the heating units 212 from room temperature to a desired final temperature. The desired final temperature may be, for example, just below the boiling point of the volatile liquid content of the containers 20 at the pressure within the heating tunnel 208. Both the final temperature and the rate of heating can be controlled by selecting the length of the tunnel 208, the speed of conveying of the containers 20 along the tunnel, and the output of the heating units.

From the tunnel 208 the containers 20 pass through a further air lock 214 into the vacuum chamber 202, which is provided with heating units 216 and a vacuum pump 218. In the vacuum chamber 202 the volatile liquid in the contents of the containers 20 is caused to boil, as described above. The power of the heating units 216 may be selected to provide the necessary latent heat of evaporation of the liquid. The capacity of the vacuum pump 218 may be selected to expel the volume of vapor produced by the boiling. If the volatile liquid is less benign or more valuable than water, the vacuum pump 218 may be provided with a filter, condenser, or other device 220 to extract or recover the volatile liquid.

Within the vacuum chamber 202, the containers 20 proceed to a sealing station 222, which may be similar to the sealing station 78. From the sealing station 222, the fully sealed containers 20 exit the vacuum chamber 202 through an air lock. As shown in FIG. 6, the exit air lock is the air lock 214. That is advantageous if the air lock 214 operates on the principle of the air lock 14 in our above-mentioned U.S. Pat. No. 5,457,939. That air lock uses the containers to largely fill carrying recesses in a revolving input/output wheel 30. The bulk of the containers reduces the amount of air that is transferred by the carrying wheel. That design is at its most efficient when both the ingoing and the outgoing sides of the wheel are used for containers. However, other forms of air lock may be used instead, and an arrangement using separate air locks for containers 20 entering and leaving the vacuum chamber 202 may be preferred, depending on the overall arrangement of the bottling plant 200.

The configuration of the bottling plant 200 shown in FIG. 6 is versatile. Depending on the construction and operation of the plant, the pressure in the heating tunnel 208 can be set anywhere between room pressure and the pressure of the vacuum chamber 202. Thus, the drop in pressure can be allocated in any proportions between the air lock 206 at room temperature and the air lock 214 at a higher temperature. In addition, the temperature at the air lock 214 can be set anywhere between room temperature and the temperature of the boiling liquid that expels air from the containers 20.

In an alternative embodiment of the bottling plant 200, the air lock 206 and the vacuum pump 210 may be omitted, and the heating tunnel 208 may be at room pressure. That alternative is simpler, but less versatile. In that alternative embodiment, there is a comparatively sudden drop in pressure of the already heated containers 20 as the containers pass through the air lock 214 into the vacuum chamber 202. The drop in pressure may cause the liquid in the containers 20 to start boiling suddenly, which may not always be desirable.

In a further alternative embodiment of the bottling plant 200, the air lock 206 is present, but the air lock 214 does not separate the heating tunnel 208 from the vacuum chamber 202. The air lock 214 is then used only for containers 20 leaving the vacuum chamber 202. The entire pressure drop is then at the air lock 206.

In the embodiment of FIG. 6, the container 20 is sealed at a sealing station 222 inside the vacuum chamber 202 before the container 20 is returned to standard atmospheric pressure. In certain circumstances it may be possible to position the sealing station 222 outside the vacuum chamber 202, for example, if the design of the containers 20 is such that atmospheric pressure on the lid 24 will close the channels 40, preventing air from re-entering the container 20 in the short time before the container can be sealed.

Various modifications and variations can be made in the present invention without departing from the spirit or scope of the invention.

A liquid other than water could be used, especially with contents 32 other than foodstuffs. However, where water is compatible with the contents 32, water has the advantage that it is a naturally-occurring component of air, so that the discharge of water vapor in steps 108 and 110 raises fewer environmental protection issues than the vapors of many other volatile liquids. Almost all foodstuffs, unless deliberately dehydrated for storage, naturally contain at least some water.

The rigid part 22 of the container 20 has been described as a tub, but may be of another desired shape, such as a dish, a bottle, a jar, or a can. If the container 20 is, for example, a jar with a narrow mouth, but the surface of the moist contents 32 or liquid 34 is in a wider part of the bottle, then appropriate adjustments may be made to the amount of unsealed opening to ensure that steam, and air displaced by steam, can escape without an excessive pressure developing inside the container.

The lid 24 has been described as a flat sheet 42 that is spread over a rim 46. Other shapes are possible. For example, the disk 42 could be welded directly to the rim of the tub 22. However, where the container 20 is sealed with an internal air space filled with steam after the expulsion of air, a substantial gauge vacuum may form inside the container as it returns to room temperature. A structure that retains its shape under those conditions is preferred for many uses. Thus, a rigid part 22 that can retain its shape under a gauge vacuum close to 1 atmosphere, and a film lid 42 stretched over a flat rim 46 and in tension under the action of the gauge vacuum on the inside of the lid, frequently provide a simple and effective embodiment of the container 20. Although some embodiments of the present process could be used for a wholly flexible package that would collapse when allowed to cool, there are other processes available for forming a collapsed flexible package. The present process is believed to be more advantageous for a container with a rigid body and a flexible lid, for which alternative methods of manufacture are less effective. For this purpose, a "rigid" body is one that substantially maintains its general shape even when returned to storage temperature, with atmospheric pressure outside and only the low vapor pressure of water or other liquid inside. Depending on the nature of the seal between the lid 24 and the bead 26, preserving the integrity of the seal may be a factor in the rigidity of the body 22.

The lid 24 has been described as being sealed to the tub 22 by clinching the skirt 54 of the rim 46 of the lid over the bead 26 of the tub. Other methods of sealing the lid 24 to the tub or other rigid container body 22 are possible, especially in the case of the lid 24 shown in FIG. 2, where the rim 46 can be sealed to the container body 22 when the lid 24 is first assembled onto the container body 22. For example, the skirt 54 and the bead 26 could be replaced by matching screw threads, and the lid 24 screwed onto the container body 22.

As noted above, various materials may be used for the rigid container body part 22, the rim 46, and the film disk 42. For example, the rigid part 22 of the container 20 may be of glass, metal, plastic, or other materials. Where the lid 24 is screwed to the container body 22, the rim 46 may be of any of a wide range of rigid materials, and may have a conventional compression seal between the rim and the container part 22. An appropriate adhesive material may then be applied between the rim 46 and the film disk 42. To ensure that the unsealed openings between the rim 26 and the lid 24 remain open to allow the air and steam to be exhausted, and are then sealed reliably, the adhesive material may be one that requires some positive action, such as the application of heat, pressure, or both, to activate the adhesive. Application of the adhesive, or a component of the adhesive, only when the container 20 is to be sealed in step 116, is possible but not usually convenient, because of the difficulty of ensuring sealing right into the corners of the gaps 40.

A construction in which the rim 46 is omitted, and the film disk 42 is sealed directly to the rim of the container body 22 is also possible, but is not presently preferred, because the seal 48 is then formed on the filled container body 22, and the risk of the seal being contaminated by the contents 32, 34 is higher.

The container 20 is described as having the openings 40 formed by gaps in the seal round the rim 26. Other arrangements are possible, with openings 40 formed in the rigid part 22, the lid 24, or both. However, forming the openings 40 as unsealed parts of the join round the edge of the film disk 42 is advantageous for many uses, because it requires no additional structure on the container 20.

Thus, it is intended that the present invention cover the modifications and variations of this invention provided they come within the scope of the appended claims and their equivalents.

What is claimed is:

1. A process for packaging materials in a container comprising a body sealed by a flexible cover, comprising:
   (a) placing a desired quantity of material comprising liquid in the container body;
   (b) securing the flexible cover on the container body by sealing the flexible cover to a more rigid rim of the cover and sealing the rim to the container body so as to leave at least one unsealed opening formed by at least one portion where the flexible cover is not sealed to the rim;
(c) bringing the temperature of the liquid to a temperature higher than its boiling temperature;
(d) permitting vapor generated by the boiling liquid to expel other gases from the container through the at least one unsealed opening; and
(e) sealing the container by sealing the flexible cover to the whole rim while gas or vapor is still flowing out of the container through the at least one unsealed opening.

2. A process according to claim 1, wherein the material is a moist foodstuff, and the liquid is water within the foodstuff.

3. A process according to claim 1, comprising sealing the flexible cover to the more rigid rim of the cover with at least one portion where the flexible cover is not sealed to the rim before placing the cover on the container body.

4. A process according to claim 1, wherein the flexible cover is formed of plastic or laminate film, and the more rigid rim is formed of metal.

5. A process according to claim 1, wherein the container body comprises a rigid metallic, plastic or glass container.

6. A process according to claim 1, wherein the total area of the at least one unsealed opening is less than 10% of the surface of the container.

7. A process according to claim 6, wherein the total area of the at least one unsealed opening is less than 2% of the surface of the container.

8. A process according to claim 7, wherein the total area of the at least one unsealed opening is less than 1% of the surface of the container.

9. A process according to claim 1, wherein bringing the temperature of the liquid to a temperature higher than its boiling temperature comprises raising the temperature of the container.

10. A process according to claim 1, wherein bringing the temperature of the liquid to a temperature higher than its boiling temperature comprises reducing the pressure of the container.

11. A process according to claim 1, wherein sealing the container while gas or vapor is still flowing out of the container through the at least one unsealed opening comprises sealing the container under a partial vacuum.

12. A method of forming a sealed container under partial vacuum, comprising:
(a) placing material comprising a volatile liquid in a container body;
(b) securing a flexible cover fixed to a more rigid rim on the container body so as to leave at least one unsealed opening formed by at least one portion where the flexible cover is not sealed to the rim;
(c) bringing the volatile liquid to a subatmospheric pressure and a temperature at which the volatile liquid is above its boiling point at the subatmospheric pressure;
(d) permitting vapor generated by boiling of the liquid to expel other gases from the container through the at least one unsealed opening;
(e) sealing the container while vapor is still flowing out of the container through the at least one unsealed opening; and
(f) cooling the container to a temperature at which the vapor pressure of the volatile liquid is substantially less than the ambient pressure outside the container.

* * * * *

UNITED STATES PATENT AND TRADEMARK OFFICE
CERTIFICATE OF CORRECTION

PATENT NO. : 8,784,920 B2
APPLICATION NO. : 11/717459
DATED : July 22, 2014
INVENTOR(S) : Jean-Francois M. Bardou et al.

It is certified that error appears in the above-identified patent and that said Letters Patent is hereby corrected as shown below:

In the Specification

Column 8, line 1, "The bottling plant 200 comprises a comprises a filling and" should read --The bottling plant 200 comprises a filling and--.

Column 9, line 49, "ajar" should read --a jar--.

Signed and Sealed this
Ninth Day of June, 2015

Michelle K. Lee
*Director of the United States Patent and Trademark Office*